United States Patent
Brown et al.

(10) Patent No.: US 7,216,220 B2
(45) Date of Patent: May 8, 2007

(54) MICROPROCESSOR WITH CUSTOMER CODE STORE

(75) Inventors: Gary L Brown, Aloha, OR (US); Christopher S. Jones, Portland, OR (US); Darrell D. Boggs, Aloha, OR (US)

(73) Assignee: Stexar Corp., Beaverton, OR (US)

( * ) Notice: Subject to any disclaimer, the term of this patent is extended or adjusted under 35 U.S.C. 154(b) by 123 days.

(21) Appl. No.: 10/891,165

(22) Filed: Jul. 14, 2004

(65) Prior Publication Data

US 2006/0015707 A1    Jan. 19, 2006

(51) Int. Cl.
G06F 9/44 (2006.01)
(52) U.S. Cl. .................................... 712/242
(58) Field of Classification Search ............... 712/242, 712/106, 111, 243, 212, 215
See application file for complete search history.

(56) References Cited

U.S. PATENT DOCUMENTS

| | | | | |
|---|---|---|---|---|
| 4,747,044 A | * | 5/1988 | Schmidt et al. | 711/202 |
| 4,761,733 A | * | 8/1988 | McCrocklin et al. | 711/212 |
| 5,235,686 A | * | 8/1993 | Bosshart | 712/247 |
| 5,796,972 A | * | 8/1998 | Johnson et al. | 712/208 |
| 5,867,701 A | * | 2/1999 | Brown et al. | 712/248 |
| 6,049,672 A | * | 4/2000 | Shiell et al. | 717/168 |
| 6,279,150 B1 | * | 8/2001 | Bachmann | 717/136 |
| 6,438,664 B1 | * | 8/2002 | McGrath et al. | 711/154 |
| 6,609,191 B1 | * | 8/2003 | Hooker et al. | 712/216 |
| 6,807,626 B1 | * | 10/2004 | Cofler et al. | 712/228 |
| 6,957,319 B1 | * | 10/2005 | McMinn et al. | 712/205 |
| 2002/0109682 A1 | * | 8/2002 | Nash et al. | 345/418 |

OTHER PUBLICATIONS

Gary B. Little, Inside the Apple lle, 1985, Prentice Hall, pp. 105-109.*

* cited by examiner

*Primary Examiner*—Eric Coleman
(74) *Attorney, Agent, or Firm*—Richard Calderwood

(57) ABSTRACT

A microprocessor including memory storage into which ISA customer code routines can be stored after having been decoded into their machine-native microinstructions. The customer code store is not subject to eviction and the like, as a cache memory would be. ISA level code can specify a routine for storage into the customer code store, at a time prior to its execution. The customer code store thus serves as a write-once execute-many library of pre-decoded routines which ISA level applications can subsequently use, permitting a system manufacturer to create a highly customized and optimized system.

5 Claims, 5 Drawing Sheets

MICROPROCESSOR WITH CUSTOMER CODE STORE

BACKGROUND OF THE INVENTION

1. Technical Field of the Invention

This invention relates generally to microprocessors, and more specifically to an improved microprocessor which includes storage into which customer-defined code routines or code segments can be explicitly loaded and held for future execution.

2. Background Art

FIG. 1 depicts an exemplary, conventional microprocessor 10. The microprocessor has an Instruction Set Architecture (ISA) such as X86, MIPS, ARM, Alpha, PowerPC, or the like. Software is written in a source code language such as C++, Pascal, Lisp, or the like, or in the ISA's assembly language, and is then compiled or assembled into native, executable ISA code. The ISA includes the complete set of things which are visible to or expressly usable by the ISA code, including instructions, registers, flags, and the like. The microprocessor typically also has a microarchitecture which is not directly visible to the ISA code, and which is used at a lower level to implement the ISA. Many microprocessors' microarchitectures are microcoded, in that they have their own "native" software format and control constructs. Typically, such microprocessors fetch ISA code, decode it, and generate a corresponding microcode flow to accomplish the functionality specified by the ISA code.

In the example shown, the microprocessor retrieves and executes this ISA code from a memory 12 under control of an instruction fetcher 14. To improve performance, the ISA code is typically stored in an instruction cache 16, and may be speculatively brought in from memory by a prefetcher 18 in coordination with a branch predictor 20. There may also be a separate data cache 22 in some instances. In the context of this invention, "memory" may be DRAM, SRAM, ROM, flash memory, hard disk, CD-ROM, DVD-RAM, or any other form of storage, and may be coupled directly to the processor or it may be coupled indirectly via one or more intervening systems or transmission means.

Regardless of how or when the ISA code is brought into the microprocessor, before it can be executed, an instruction decoder 24 parses the incoming ISA code to ascertain which instructions are contained in the code. In many machines, the instruction decoder generates microcode including a series of one or more microinstructions which correspond to a given ISA instruction. While the ISA code may be thought of as being the "native" instructions of the architecture, the microcode (μcode) is the "native" instructions of the microarchitecture or the execution units 26 in the microprocessor. Two microprocessors may share the same ISA but have wildly different microcode instruction sets.

Some ISA instructions, such as trigonometric math functions, require complex operations, and result in lengthy microcode flows. In many instances, it is beneficial to permanently store these microcode flows in a microcode read-only memory (ROM) 28. When the instruction decoder detects such an ISA instruction, the instruction decoder triggers the microcode ROM to output the corresponding microcode flow.

The microcode from the instruction decoder and/or from the microcode ROM is sent to a microinstruction scheduler 30 which controls the delivery of the microcode instructions to the various execution units of the microprocessor, in accordance with the availability of the execution units, the availability of the required input data operands for the microinstructions (μops), and so forth. Ultimately, the microinstructions are executed and their results are written to the memory (typically through the data cache).

The contents of the microcode ROM are determined by the microprocessor manufacturer at manufacturing time, and cannot be changed by the customer, the ISA-level programmer, nor the end user. So, although the microcode ROM holds code flows for later execution, it cannot be modified nor customized by the customer. A few microprocessors have included the ability for the manufacturer to "patch" the microcode at any time after manufacturing, by loading a sequence of microcode into a microcode patch RAM (not shown). The patch facility is typically used by the manufacturer to work around errata in the microprocessor. The ability to load a patch is among the most tightly protected trade secrets of the manufacturer, with strong encryption protection and verification mechanisms, and is absolutely not exposed to customers or users for their use.

The customer does have some limited control over the contents of the instruction cache. If the customer has a good measure of control over, and knowledge of, all code that may potentially be running on the microprocessor, the customer can to a limited extent control the contents of the instruction cache simply by e.g. making sure that his code ("customer code") is small enough to fit within the instruction cache without causing evictions and overwriting. However, if other code, such as the operating system, interrupt handler, or another software application suddenly becomes active, it may cause the eviction of the code which the customer wanted in the cache. This will result in degraded performance and, significantly, non-deterministic execution time (both in terms of throughput and latency) of the customer code, when the customer code must be re-fetched into the cache. Some processors allow the cache to be locked, preventing eviction of its contents. In some instances, it may be advantageous for the customer to load the instruction cache with the customer code, and then execute the instruction which locks the cache (typically by setting a bit in a control register). This requires that the customer have a great deal of control over exactly what software is running on the processor. Otherwise, he cannot guarantee that the customer code will, in fact, be present in the cache when he locks it. Also, the code which is to be locked in the cache must be executed in order to be loaded into the instruction cache; merely reading the code would cause it to be loaded into the data cache. The customer cannot load the instruction cache without executing the customer code once. And, once the instruction cache is locked, it cannot be used to improve performance of other code, and overall system performance suffers.

Furthermore, the instruction cache holds ISA code, not microcode. The contents of the instruction cache must be decoded at every execution instance, such as when looping. In a few existing microprocessors, such as the Intel Pentium 4 processor, a "trace cache" holds decoded and loop-unrolled microcode. However, the customer has essentially zero control over the contents of the trace cache.

Microprocessor manufacturers typically do not disclose the format of their microcode to customers or anyone else, and often take extreme measures to prevent others from gaining access to the microcode or writing code in its format.

What is desirable, then, is an improved microprocessor which includes a customer code store which is not subject to the vagaries of cache eviction, which stores pre-decoded microcode which can be fed directly to the execution units without using or being limited by instruction decoder bandwidth, which can be loaded without executing the code, and which permits the customer to control the contents of the customer code store in terms of what algorithms are stored therein, for what time they are so stored, and when that code gets executed.

DETAILED DESCRIPTION

The invention will be understood more fully from the detailed description given below and from the accompanying drawings of embodiments of the invention which, however, should not be taken to limit the invention to the specific embodiments described, but are for explanation and understanding only.

Figure 1:
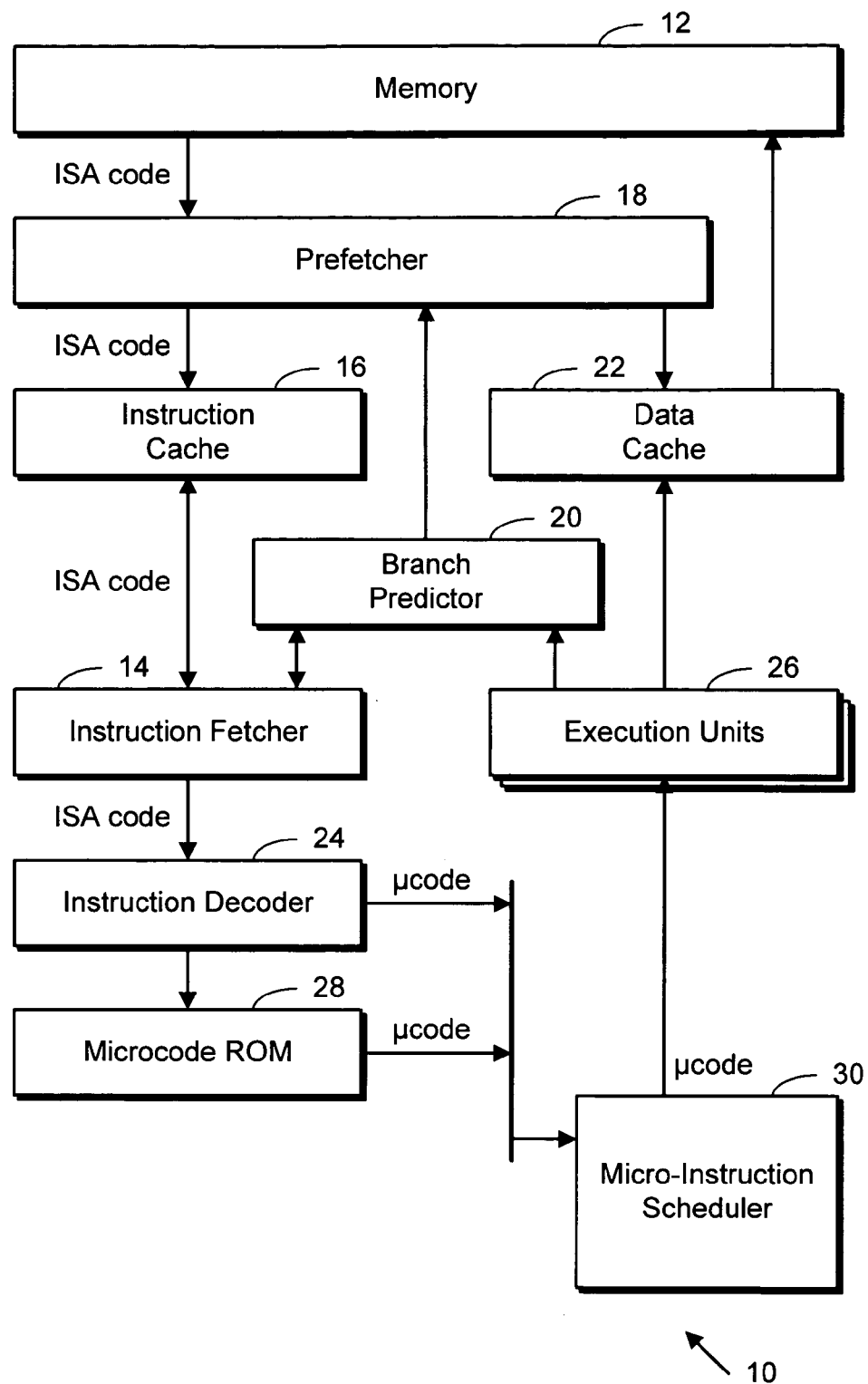
FIG. 1 shows a typical microprocessor according to the prior art.
Figure 2:
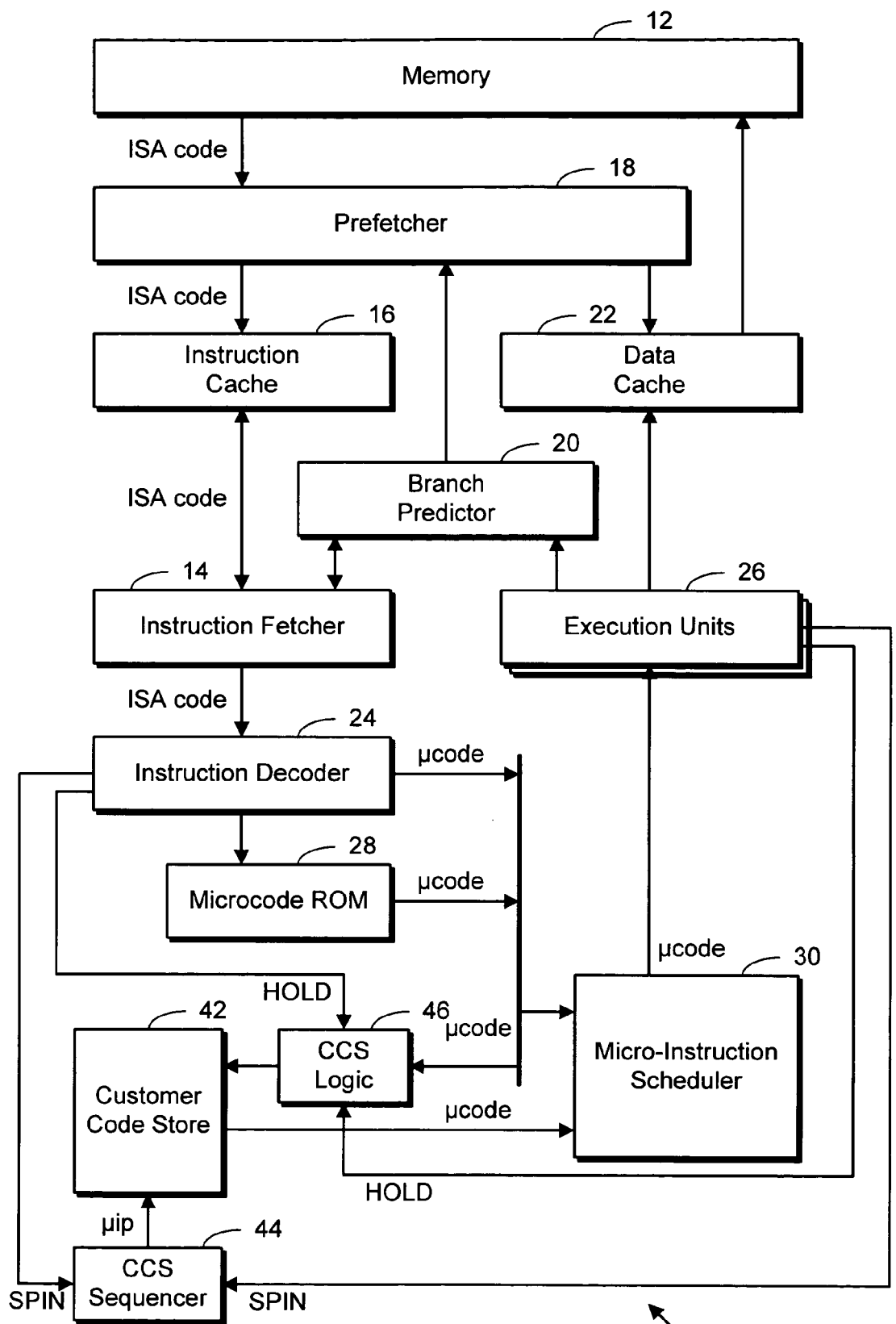
FIG. 2 shows one embodiment of a microprocessor adapted with the customer code store of the present invention.

FIG. 2 illustrates a microprocessor 40 according to one embodiment of this invention. The microprocessor includes an instruction fetcher 14 which fetches ISA instructions from a memory 12, an instruction decoder 24 which decodes the ISA instructions into microinstructions, and execution units 26 substantially as those found in the prior art. It may also include a prefetcher 18, an instruction cache 16, a microcode ROM 28, and a microinstruction scheduler 30 substantially as those found in the prior art.

The microprocessor is improved with the addition of a Customer Code Store (CCS) 42 with an attendant CCS Sequencer 44 and CCS Logic 46. The customer is given the ability to explicitly load code into the CCS. In some embodiments, the customer is given the ability to explicitly load code on a routine basis ("routine" in the sense of "subroutine", "process", or "function"). In other embodiments, customer code may be loaded simply as code segments, and not necessarily self-contained, complete subroutines.

The ISA is extended by the addition of a new instruction (a "BEGIN_CCS" instruction or the like), which, when encountered by the instruction decoder (or, in some embodiments, by an execution unit), causes a subroutine, algorithm, or other code sequence (the "customer code") to be stored into the CCS.

In some embodiments, the customer code follows the BEGIN_CCS instruction as in-line code, and its end is denoted by another new ISA instruction (an "END_CCS" instruction) or the like. In other embodiments, the customer code can reside elsewhere, and the BEGIN_CCS instruction includes or is followed by a pointer to the customer code. In some embodiments, rather than using a second ISA instruction (END_CCS) to demarcate the end of the customer code, the BEGIN_CCS instruction may be provided with a parameter specifying the length of the customer code. In some embodiments, customer code is always loaded on a routine basis, with the "Return" or other such instruction marking the end of the customer code routine, and an END_CCS instruction is not needed, nor is any indication of the length of the routine. In some embodiments, the END_CCS instruction may be converted into a microcode return instruction at the end of the customer code routine, while in others it may not be decoded into any microcode instructions in the customer code routine. Other alternative methodologies may be employed, such as by using the same MARK_CCS instruction at the start and end of the customer code. In other embodiments, the difference between the BEGIN_CCS, END_CCS, MARK_CCS, RUN_CCS, etc. instructions may simply be a data parameter associated with a single new ISA instruction.

When the microprocessor detects that it has encountered the beginning of a customer code sequence, a HOLD signal is triggered, causing the CCS Logic to begin storing the customer code sequence into the CCS. In some embodiments, the HOLD signal is issued by the instruction decoder upon decoding the BEGIN_CCS instruction. In other embodiments, the HOLD signal is issued by the execution unit which executes the BEGIN_CCS instruction.

The customer code sequence is fetched from memory in ISA format and converted into microinstructions by the instruction decoder. The CCS stores the resulting sequence of microinstructions, rather than ISA instructions, for later execution without needing to pass through the decoder again. These microinstructions are not executed at this time, but are merely stored into the CCS for later use. The customer code sequence is stored into the CCS until the END_CCS instruction is decoded (or executed), which causes the decoder (or execution unit) to deassert the HOLD signal, and the processor returns to the normal decode/execution mode of operation at the instruction following the customer code sequence.

In some embodiments, the execution unit(s) may be deactivated while the processor is storing the customer code sequence into the CCS. In other embodiments, the execution units may remain active, and the processor may continue executing other code in parallel with its decoding and storing of the customer code sequence, such as other threads in a multi-threaded processor, or such as other applications or the like in a time-sliced multi-processing microprocessor. In some instances, especially those in which the customer code sequence is not in-line with the BEGIN_CCS instruction, execution of the normal code flow may immediately continue with the instruction immediately following the BEGIN_CCS instruction. But even in those instances, execution will generally need to be delayed if the processor encounters a RUN_CCS instruction which references a customer code sequence which has not yet been completely decoded and stored into the CCS.

In various embodiments, the processor may provide a variety of ways for the ISA code to later call or otherwise cause execution of the stored microcode customer code routine. In one embodiment, the address of the first microinstruction in the customer code routine is returned to the ISA level, such as by leaving the value in a predetermined register or on top of the stack or in e.g. a predetermined memory location. Then, when the ISA level code wishes to execute the customer code routine in the CCS, it may use this value as a parameter, and the CCS Sequencer will begin pulling microinstructions from the CCS at that address. In other embodiments, the CCS Sequencer may provide a lookup table; for example, the ISA level code may indicate in the BEGIN_CCS instruction that the customer code routine is to be known as routine "43" or as the "Init_Cursor" routine, and the lookup table will provide a translation from that name to the corresponding location of the beginning of that customer code routine.

Later, when the application or other software wishes to execute the previously-stored customer code sequence, the application provides a RUN_CCS ISA instruction. When the instruction decoder (or, in some embodiments, an execution unit) encounters the RUN_CCS instruction, it triggers a SPIN signal which causes the CCS Sequencer to begin reading the customer code sequence out of the CCS for receipt by the microinstruction scheduler.

In some embodiments, the customer code and regular, decoded microcode from the instruction decoder and/or microcode ROM can be provided simultaneously to the microinstruction scheduler. In various embodiments, the microinstruction sequencer is configured to give priority to one or the other, or to interleave them, or the like.

Figure 3:
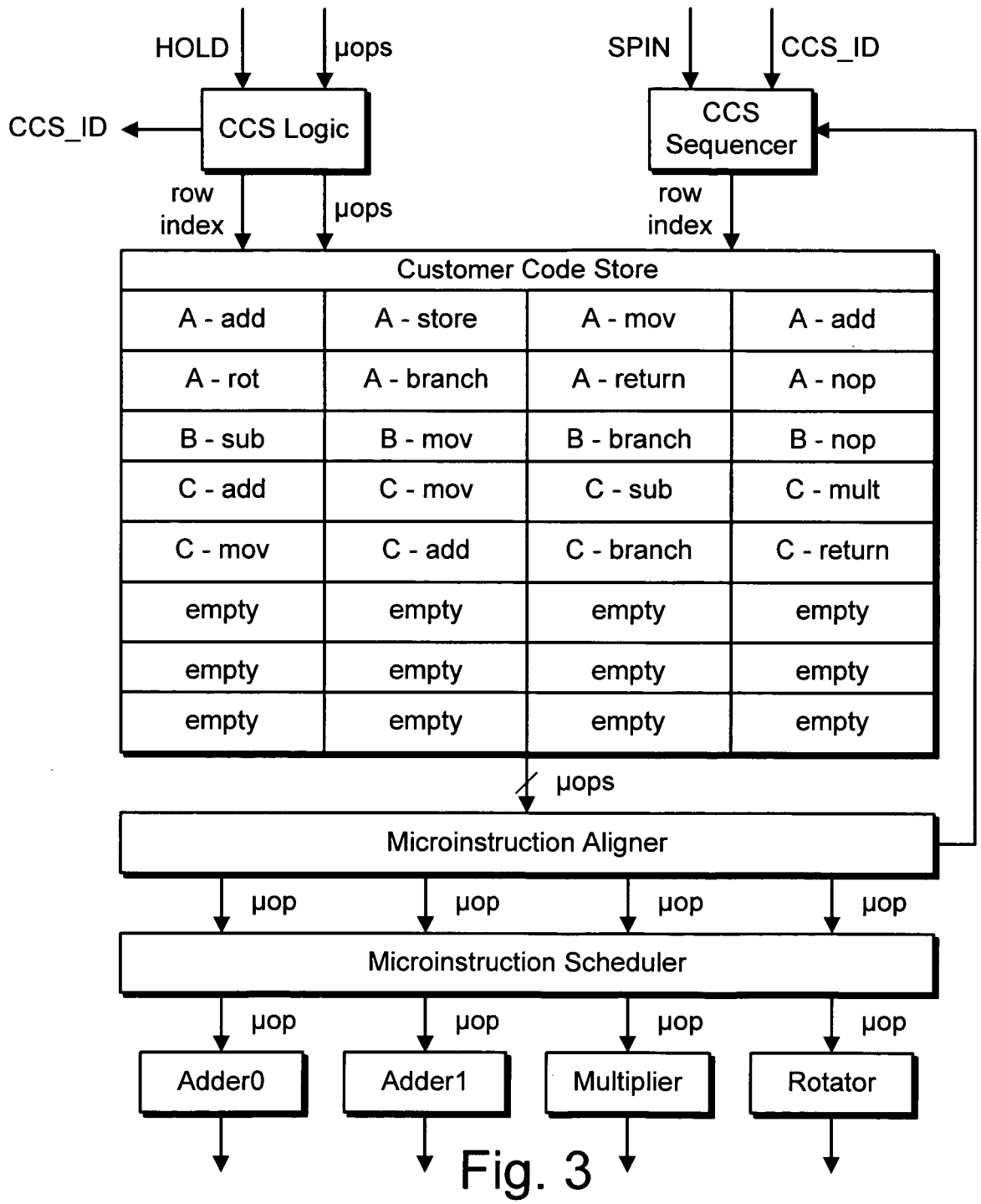
FIG. 3 shows one embodiment of a customer code store holding three customer code routines.

FIG. 3 illustrates one embodiment of a CCS which is organized in rows which are four microinstructions wide, and which has been loaded with three exemplary customer code routines denoted "A", "B", and "C". Initially, the CCS is empty.

Upon decoding or execution of the BEGIN_CCS instruction of the "A" routine, the HOLD signal is asserted. As the ISA instructions of the "A" routine are decoded and their corresponding microinstructions arrive, the CCS Logic assembles them into complete rows for storing into the CCS. For example, a first ISA instruction "ADD" may decode into two microinstructions: "A—add" and "A—store". (The initial "A", "B", or "C" indicates merely that these microinstructions belong to the first, second, or third customer code routine, respectively, for purposes of FIG. 3, and is not actually part of the microinstruction.) In the case where the CCS is four microinstructions wide, the CCS Logic may hold these two initial microinstructions temporarily. Then, a next ISA "Mov" instruction decodes to an "A—mov" microinstruction, which the CCS Logic also holds. Then, a next ISA "ADD" instruction decodes to an "A—add" microinstruction. At this point, a complete row's worth of microinstructions have been accumulated by the CCS Logic, which then issues the row index to the CCS's addressing logic (not shown), and outputs the assembled CCS line of microinstructions for the CCS to write into its memory storage locations.

In many instances, a customer code routine will not exactly fill an integer multiple of CCS rows, in which case the CCS Logic may, in some embodiments, insert "NOP" inert instructions to pad the final row of the customer code routine in the CCS, and the next customer code routine will be stored beginning at the next complete row. In other embodiments, perhaps at the expense of more complex logic, the CCS Logic may not insert "NOP" instructions and may begin the next customer code routine at the next available location, whether or not it is at the start of a row.

In some embodiments, upon loading the CCS with code, the CCS Logic returns a value (CCS_ID) to the ISA level of the processor, identifying the location at which the customer code routine has been stored. The ISA level applications and other code can subsequently use this identifier to call (execute) the customer code routine. When the decoder encounters the RUN_CCS instruction, the instruction will include the CCS_ID value as an operand, and the an execution unit or register file or the like will issue the CCS_ID value to the CCS Sequencer along with the SPIN signal. The CCS Sequencer then issues the appropriate row index (or other suitable pointer or value) to the CCS's addressing logic, causing the customer code routine to be read out. In some embodiments, the CCS outputs an entire row at a time. In other embodiments, it may output less than a complete row of microinstructions, or even a single microinstruction, at a time.

The CCS_ID value may simply be the row index value where the customer code begins. Alternatively, it may be a pointer to a memory location which contains the row index. Or, it may be an index into a dedicated list of row index values. In some embodiments, the CCS mechanism may be enhanced to enable the ISA application to, for example, specify a name of the customer code routine. Then, when the ISA application subsequently calls that routine, it issues the RUN_CCS instruction with a parameter value including the name as a string. In some such embodiments, the processor maintains a lookup table of index to row values. When the customer code routine is moved by the processor, the processor updates this lookup table. The CCS Sequencer performs a lookup on that name to locate the address of the code in the CCS. This enables the CCS or the CCS Logic to move the customer code routine to a different location than where it was initially stored, e.g. in order to coalesce free space upon deallocation of another customer code routine.

In some embodiments, the CCS includes a microinstruction aligner which assists the microinstruction scheduler by pre-aligning the microinstructions into pipeline slots into which they can best be executed. For example, in some embodiments the aligner may rotate all "add" microinstructions into the first two pipeline slots (in a VLIW-like machine) to be pre-positioned for execution by adders which occupy those slots.

In some embodiments, a customer code routine may be ended with a "return" microinstruction or the like. In other embodiments, a bit field may indicate that the microinstruction is the final one in the customer code routine. During execution of the customer code routine, when the end-of-routine indicator is encountered, machine control is given back to the normal fetch/decode/execute pipeline which then continues normal execution at the next instruction after the RUN_CCS instruction. In some embodiments, various other conditions may cause control to be returned to the normal pipeline, such as if something has gone wrong or the customer code routine executes a branch which illegally (e.g. not a return) transfers control outside of the stored routine. In some embodiments, instructions within the customer code sequence are allowed to legally call, jump, branch, or otherwise transfer control outside the customer code sequence, at any arbitrary location within the customer code sequence, and transfer is not limited to a return instruction at the end of the customer code sequence. In some embodiments, various conditions may cause control to be transferred (either temporarily or permanently) out of the customer code sequence; for example, an exception condition such as a NaN (not-a-number) or a divide-by-zero may cause control to be given to an exception handler in the normal code flow. Depending upon the implementation, control may or may not return to the customer code routine after such external code has completed its task.

Figure 4:
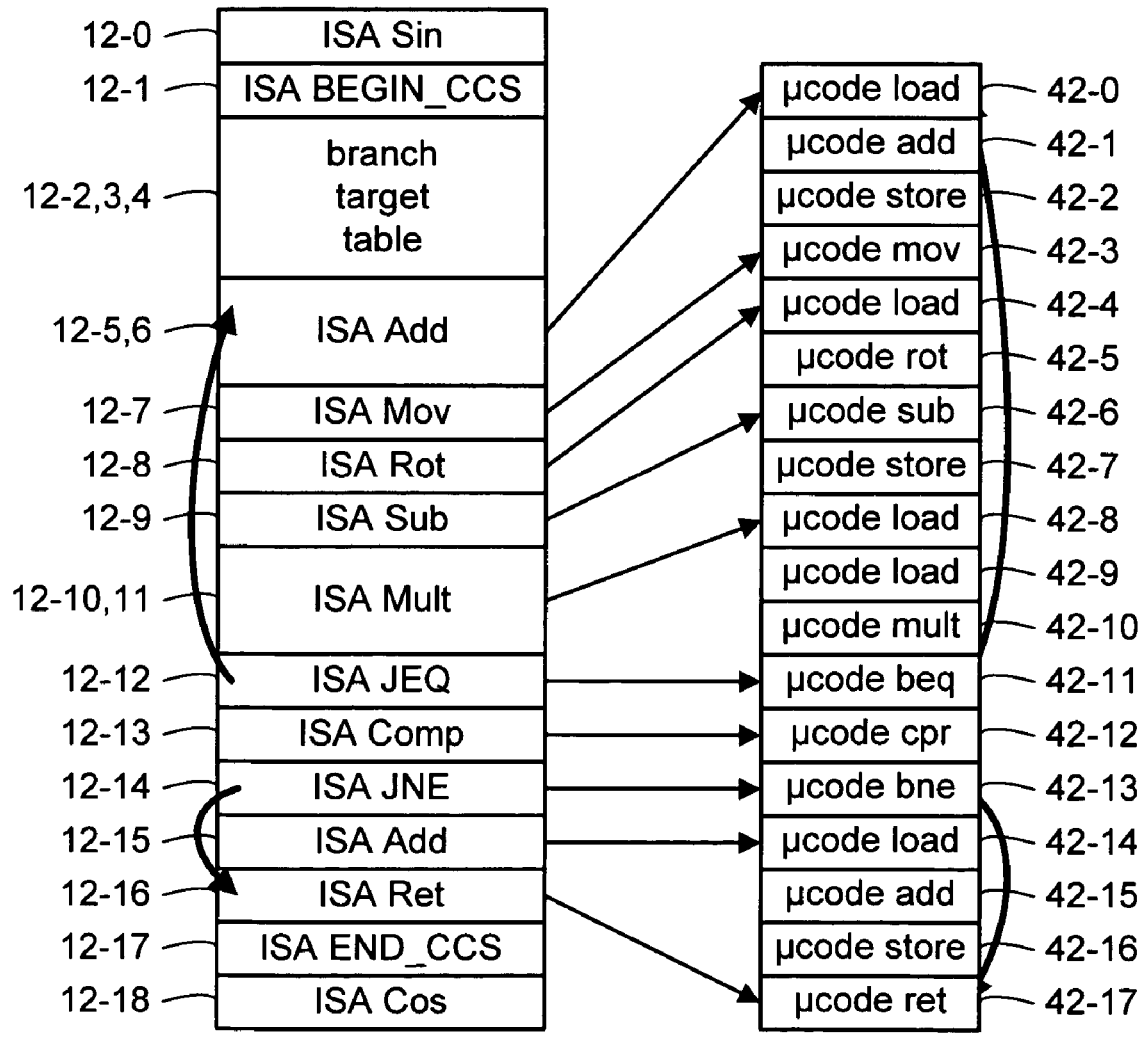
FIG. 4 shows an ISA routine in memory and its corresponding microcode routine in the customer code store.

FIG. 4 illustrates one example of an ISA code sequence and its post-decode microcode counterpart. The ISA code includes a plurality of instructions, such as Add, Mov, etc. each occupying one or more locations in the memory 12. The skilled reader will appreciate that e.g. "12-1" is merely a convenient shorthand representing essentially an offset into the memory block 12, and that the actual physical address may be any value whatsoever. For example, memory location 12-0 includes an ISA Sin instruction which represents normal "decode and execute" code, followed by a the ISA instruction BEGIN_CCS at memory location 12-1 which denotes the beginning of a customer code routine which is to be loaded into the CCS. A branch target table, which may be required for some embodiments, follows the BEGIN_CCS instruction at memory locations 12-2,3,4. The first ISA instruction of the customer code routine is an ISA Add instruction at memory locations 12-5,6. The rest of the customer code routine follows in memory, terminated by an ISA END_CCS instruction at memory location 12-17, and the normal execution mode code continues with an ISA Cos instruction at location 12-18.

The microcode sequence includes a plurality of microinstructions each occupying one or more locations in the CCS 42. Ordinarily, microinstructions are all the same length, but in some embodiments they may not be.

ISA branch instructions can in some embodiments be a special problem for the CCS logic, in situations where there is not an exact 1-to-1 mapping between the respective sizes of an ISA instruction and its corresponding microinstruction(s). This is because the branch target location—the memory location of the instruction to which the instruction pointer (IP) should advance if the branch is taken—can be relative to the current IP or relative to some fixed memory location (such as the initial memory address zero).

In the example shown, an ISA "jump if equal" instruction at memory location 12-12 branches back to the ISA "add" instruction at memory location 12-5, and an ISA "jump if not equal" instruction at memory location 12-14 branches forward to an ISA "return" instruction at memory location 12-16.

FIG. 4 and FIG. 5 together illustrate one method of operation according to this invention. In this embodiment, when the compiler (not shown) compiles the customer code routine, it includes with the ISA code a data table which identifies the ISA memory locations (in relative address form, logical address form, or whatever form is suitable) of all branch targets in the customer code routine. This data table may be inserted into the code directly following the BEGIN_CCS instruction (not shown), or it may be inserted into the data segment of the software application.

Figure 5A:
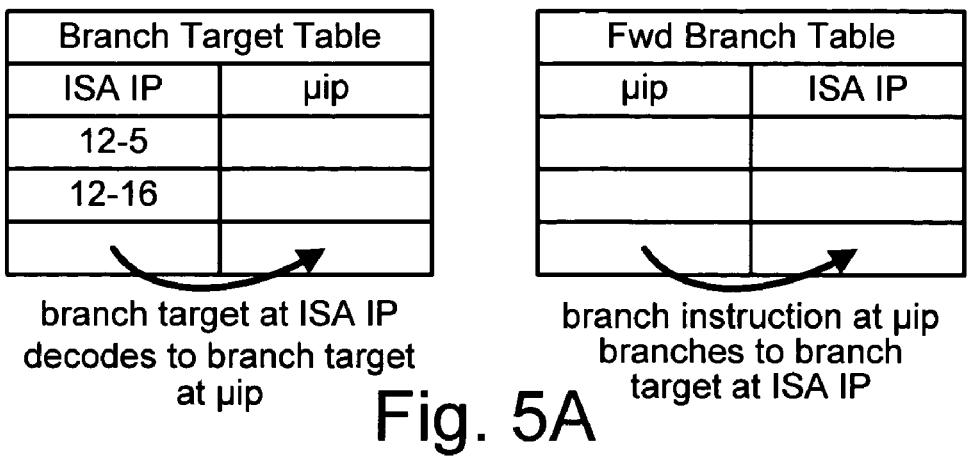
FIG. 5 shows the contents of tables which may be used in resolving branch targets in the microcode routine in the customer code store.

The decoder, packer, and/or customer code store logic (of FIG. 2) load this list of branch instructions into the ISA IP side of a Branch Target Table. In the example shown, the two branch target instructions' addresses 12-5 and 12-16 are loaded into the table, as shown in FIG. 5A.

The Branch Target Table will, when completed, identify the CCS address corresponding to each of the ISA branch target addresses. A Forward Branch Table, which is initially empty, is used to keep track of branch instructions whose branch target CCS addresses cannot be determined in a single decode pass (because they are forward branches). Backward branches do not need such a table, because they branch backward, to instructions which will have already been decoded.

Either a forward branch or a backward branch may target an instruction not in the CCS. These branch instructions will not get their branch target addresses fixed or patched in the CCS; upon execution of such an incomplete instruction, the customer code sequence will be exited and control will be relinquished to the normal fetch/decode path.

The BEGIN_CCS instruction itself is not necessarily decoded into any microinstructions, in implementations in which the decoder issues the HOLD signal. Even in implementations in which the BEGIN_CCS instruction is decoded into one or more microinstructions which are executed, and the execution unit issues the HOLD signal, these microinstructions are not stored in the CCS. The BEGIN_CCS instruction simply serves as a control marker causing correct operation of the machine with respect to the actual customer code routine.

Figure 5B:
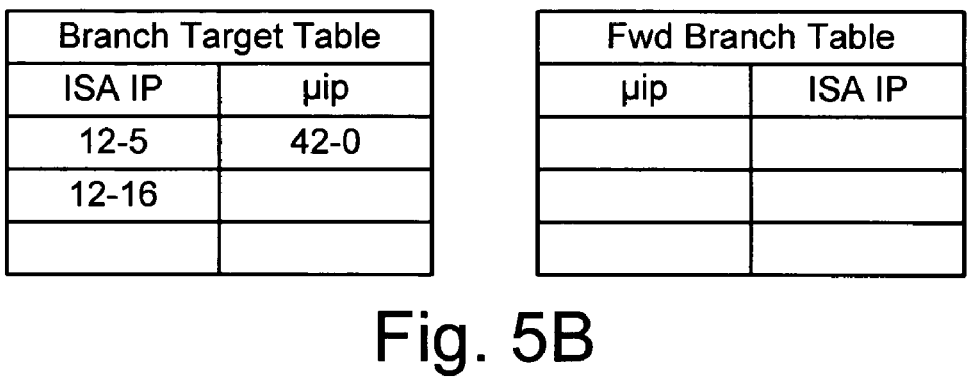

The decoder begins, in the example shown, by decoding the ISA "Add" instruction at memory locations 12-5 and 12-6 into three microinstructions—a load, an add, and a store—which are stored into the CCS at memory locations 42-0 through 42-2. Upon decoding each ISA instruction, the CCS logic examines the ISA address of that instruction—in this case 12-5—to see whether it is found in the Branch Target Table. This initial instruction is found in the table, and therefore the CCS logic updates the entry corresponding to ISA IP 12-5 with CCS address 42-0 (as shown in FIG. 5B) indicating that the CCS address 42-0 corresponds to the first microinstruction into which that ISA instruction has been decoded.

The decoder advances through the customer code routine, decoding the next several instructions into their corresponding microinstructions. Each is checked as to whether it is a branch target and, because it is not, nothing is done to the Branch Target Table.

Each ISA instruction is also checked to see whether it is a branch instruction. The ISA "jump if equal" instruction at memory location 12-12 is determined to be a branch instruction, and the CCS logic checks to see whether its branch target address (12-5) is found in the Branch Target Table. It is, and the table already includes a valid microcode branch target address corresponding to that ISA address, so the decoder or CCS logic includes that CCS address (42-0) in the appropriate location within the one or more microinstructions into which this ISA instruction is being decoded—in this case, the address 42-0 may be included as an operand in the "branch if equal" microinstruction at location 42-11.

Figure 5C:
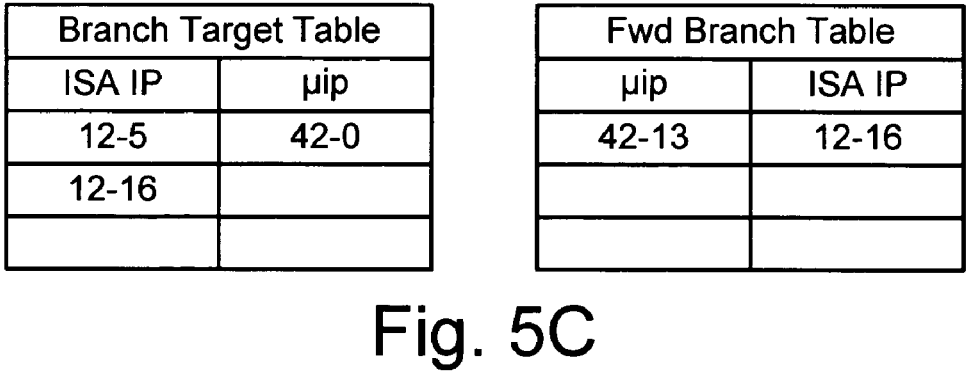

Decoding continues as described above, until the ISA "jump if not equal" instruction is encountered at address 12-14. This ISA instruction branches to memory location 12-16, which is forward from the currently decoded instruction. The branch target address is found in the Branch Target Table, but its entry does not yet contain a valid, corresponding CCS address, because the branch is forward and the decoder hasn't gotten there yet. Therefore, the CCS logic makes an entry in the Forward Branch Table indicating that the microinstruction at location 42-13 needs to be fixed later when there is determined a CCS address which corresponds to the ISA branch target address 12-16 (as shown in FIG. 5C).

Figure 5D:
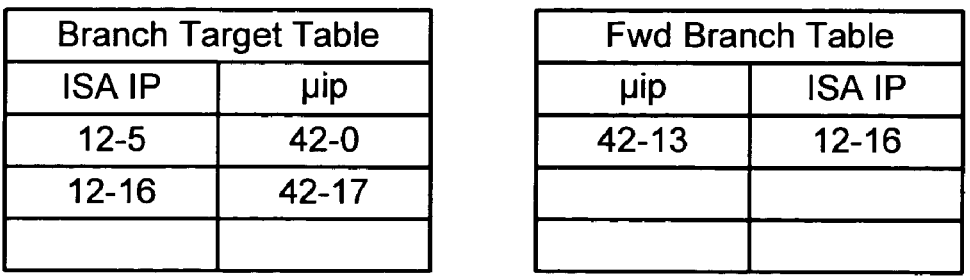

Decoding continues as described above, until the Return instruction at ISA memory location 12-16 is encountered. This address is found in the Branch Target Table, so its corresponding CCS address 42-17 is entered into the Branch Target Table (as shown in FIG. 5D).

Either immediately after each branch target microaddress is resolved, or at the end of the customer code routine decode, the CCS logic runs through the Forward Branch Table. Each time it finds a Forward Branch Table entry for an ISA IP which is also found in the Branch Target Table with a valid CCS address (µip), the CCS is patched to insert the newly-identified microinstruction branch target address into the customer code routine. In the example given, the Forward Branch Table entry for CCS address 42-13 is correlated with ISA address 12-16, which is looked up in the Branch Target Table (and is now found), and the corresponding branch target CCS address 42-17 is retrieved; this µip 42-17 is then patched into the microcode branch instruction at CCS address 42-13.

In some embodiments, once all Branch Target Table entries have valid CCS addresses, the CCS logic can stop further dealing with the Forward Branch Table, because there will be no more forward branches to yet-undetermined addresses within the microcode customer code routine. When the END_CCS instruction is encountered at memory address 12-17 by the decoder, the Branch Target Table and the Forward Branch Table can be invalidated or zeroed, and the HOLD signal is deasserted. In some embodiments, the tables are not invalidated, but can be used to facilitate indirect branches within the CCS. In some embodiments, the Branch Target Table can be used to allow customer code routines loaded at different times to branch into each other and share each other's code. The next instruction, at address 12-18 is a part of the normal decode-and-execute flow, so the microinstructions into which it is decoded are not entered into the CCS.

In another embodiment, the compiler is not required to include the list of branch targets in the code. In this embodiment, the decoder enters a double-pass mode when it encounters a BEGIN_CCS instruction, and returns to normal, single-pass mode when it encounters an END_CCS instruction. The first pass is used to build a list of branch targets, and optionally to do as much decoding and CCS loading as possible. The second pass is used to patch the microcode branch targets which could not be resolved in the first pass, such as those of forward branches.

CONCLUSION

When one component is said to be "adjacent" to another component, it should not be interpreted to mean that there is absolutely nothing between the two components, only that they are in the order indicated.

The various features illustrated in the figures may be combined in many ways, and should not be interpreted as though limited to the specific embodiments in which they were explained and shown.

The term "processor" has been used in this disclosure to refer to any of a variety of data processing mechanisms. This invention may be used in, for example, a monolithic single-chip microprocessor, a multi-chip processor module, an embedded controller, a microcontroller, a digital signal processor, or a variety of other such machines capable of executing software. The software itself may be of any of a variety of forms, and perform any of a variety of functions. For example, the software may be an operating system, an application, a driver, a codec, or what have you. The processor may have any of a variety of Instruction Set Architectures, such as X86, MIPS, ARM, Alpha, PowerPC, or the like. Different processors may, even within the same ISA, have any of a variety of microarchitectures. The ISA code may be retrieved for execution from any of a variety of "memory" sources, such as DRAM, flash memory, EPROM, cache, disc, hard disk, tape, or what have you, any of which may be either internal to the processor or externally located. In some embodiments, the microcode may be stored internally within the processor, while in other embodiments it may be stored externally. The CCS may be internal to the processor, such as located on the same monolithic semiconductor chip with the processor, or it may be externally located. In some embodiments, two or more native instructions may be used to perform the functionality described herein for e.g. "a BEGIN_CCS instruction". The CCS Memory may also physically be part of an on-chip instruction cache or other such structure, rather than being a separate, dedicated memory structure; in such cases, the cache management hardware may provide a means for preventing customer code routines from being evicted from the cache memory structure, while allowing the remainder of the instruction cache to be operated in a normal unlocked cache manner. In such cases, the overall cache structure will include both cached ISA instructions and decoded-into-microcode customer code routines.

Although the processor has been described as not executing the customer code routine, but merely decoding and storing it, when the customer code routine is initially loaded, other processor implementations could execute it at load time and simply discard the results without committing them to machine state.

While the machine has been described with reference to single-threaded implementations thereof, the invention can readily be used in multi-threaded machines. In such cases, while a customer code routine is being decoded and loaded into the CCS, other code streams may simultaneously be flowing through the normal decode/execute path of the processor, with only the customer code routine bypassing execution. Another implementation could allow one or more customer code sequences to be read from the CCS simultaneously while one or more other customer code sequences are being decoded and loaded into the CCS.

Those skilled in the art having the benefit of this disclosure will appreciate that many other variations from the foregoing description and drawings may be made within the scope of the present invention. Indeed, the invention is not limited to the details described above. Rather, it is the following claims including any amendments thereto that define the scope of the invention.

What is claimed is:

1. A method of executing code in a processor, wherein the processor has an Instruction Set Architecture and a microcoded microarchitecture including an execution unit, and wherein there is provided a memory containing ISA instructions, the method comprising:
   fetching from the memory a first ISA instruction which identifies the presence of a customer code routine;
   decoding the first ISA instruction;
   in response to the first ISA instruction,
      fetching from the memory a customer code sequence of ISA instructions,
      decoding the customer code sequence of ISA instructions into a customer code sequence of first microinstructions, and
      storing the customer code sequence of microinstructions for future execution;
   fetching from the memory a second ISA instruction which is not part of the customer code sequence;
   decoding the second ISA instruction into at least one second microinstruction; and
   executing the second microinstruction; and wherein
   at least one of decoding and storing the customer code sequence is done in parallel with executing the second microinstruction.

2. A microprocessor having an ISA and for coupling to a memory containing ISA instructions, the microprocessor comprising:
   means (14,18,20) for fetching a first, second, and third groups of ISA instructions from the memory;
   means (24) for decoding the first, second, and third groups of fetched ISA instructions into first, second, and third groups of microinstructions, respectively;
   means (42) for storing the second group of decoded microinstructions for subsequent execution;
   means (26) for executing microinstructions; and
   means (30,44) for scheduling the first group of decoded microinstructions in response to decoding of the first group of fetched ISA instructions into the first group of microinstructions, and for scheduling the second group of decoded microinstructions in response to one of decoding and executing the third group of microinstructions.

3. The microprocessor of claim 2 further comprising:
means (24,42,30) for simultaneously issuing microinstructions from the first and second groups of microinstructions.

4. The microprocessor of claim 2 further comprising:
means (28) for storing a fourth group of microinstructions.

5. The microprocessor of claim 2 further comprising:
means (24,28,42,30) for simultaneously issuing microinstructions from the first, second, and fourth groups of microinstructions.

* * * * *